US006801682B2

(12) United States Patent
Zhang et al.

(10) Patent No.: US 6,801,682 B2
(45) Date of Patent: Oct. 5, 2004

(54) LATCHING APPARATUS FOR A MEMS OPTICAL SWITCH

(75) Inventors: Nan Zhang, Chanhassen, MN (US); Hong Zhang, Richfield, MN (US); Gary Nault, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 107 days.

(21) Appl. No.: 09/860,300

(22) Filed: May 18, 2001

(65) Prior Publication Data

US 2002/0172452 A1 Nov. 21, 2002

(51) Int. Cl.[7] ................................................ G02B 6/42
(52) U.S. Cl. ....................................................... 385/18
(58) Field of Search ............................. 385/18, 19, 14, 385/16

(56) References Cited

U.S. PATENT DOCUMENTS

| 4,269,648 A | 5/1981 | Dakss et al. |
| 5,018,812 A | 5/1991 | Fukuda |
| 5,110,760 A | 5/1992 | Hsu |

(List continued on next page.)

FOREIGN PATENT DOCUMENTS

| DE | 42 21 918 A1 | 1/1994 |
| EP | 0 647 966 A1 | 4/1995 |
| JP | 53084738 | 7/1978 |
| JP | 01224709 | 9/1989 |
| WO | WO 98/12589 | 3/1998 |
| WO | WO 99/36948 | 7/1999 |
| WO | WO 99/50863 | 10/1999 |
| WO | WO 01/50172 A2 | 7/2001 |
| WO | WO 02/05012 A2 | 1/2002 |

OTHER PUBLICATIONS

Article entitled "Vertical Mirrors Fabricated by Reactive Ion Etching for Fiber Optical Switching Applications" by Marxer et al., 6 pages.
Article entitled "Microactuated Micro–X.Y.Z.Stages for Free–Space Micro–Optical Bench" by Lin et al., 6 pages.
Document entitled "Folded Beam Structures in Polysilicon Resonators" printed from internet site www.aad.Berkeley.edu, Jan. 25, 1999, 3 pages.
Document entitled " Total MEMS Solutions™, Advanced MicroMachine Incorporate" printed from internet site www-memslink.com, Apr. 26, 1999, 2 pages.

(List continued on next page.)

Primary Examiner—Michael P. Stafira
Assistant Examiner—Juan D Valentin, II
(74) Attorney, Agent, or Firm—Merchant & Gould PC

(57) ABSTRACT

A MEMS-based latching device is described. In accordance with one embodiment, a micro electromechanical system is formed on a substrate. The system includes a positionable member capable of being moved between at least two positions relative to the substrate. An actuator such as a comb drive actuator is provided which may include a stationary comb mounted on the substrate, a moveable comb interleaved with the stationary comb, and a beam connected between the substrate and the moveable comb. The comb drive actuator is coupled to a latching member so that the latching member can be moved between a first position and a second position. In the first position, the latching member engages the positionable member to prevent the positionable member from moving. In the second position, the latching member is disengaged from the positionable member to allow movement of the positionable member. The combs of the comb drive actuator deflect the beam to move the latching member from the first to the second position.

28 Claims, 9 Drawing Sheets

U.S. PATENT DOCUMENTS

| | | | |
|---|---|---|---|
| 5,148,506 | A | 9/1992 | McDonald |
| 5,155,778 | A | 10/1992 | Magel et al. |
| 5,199,088 | A | 3/1993 | Magel |
| 5,232,866 | A | 8/1993 | Beyer et al. |
| 5,239,599 | A | 8/1993 | Harman |
| 5,290,400 | A | 3/1994 | Bobbio |
| 5,345,521 | A | 9/1994 | McDonald et al. |
| 5,375,033 | A | 12/1994 | MacDonald |
| 5,393,375 | A | 2/1995 | MacDonald et al. |
| 5,403,673 | A | 4/1995 | Haga et al. |
| 5,420,067 | A | 5/1995 | Hsu |
| 5,576,147 | A | 11/1996 | Guckel et al. |
| 5,578,975 | A | 11/1996 | Kazama et al. |
| 5,594,818 | A | 1/1997 | Murphy |
| 5,594,820 | A | 1/1997 | Garel-Jones et al. |
| 5,616,514 | A | 4/1997 | Muchow et al. |
| 5,618,383 | A | 4/1997 | Randall |
| 5,623,564 | A | 4/1997 | Presby |
| 5,623,568 | A | 4/1997 | Khan et al. |
| 5,627,924 | A | 5/1997 | Jin et al. |
| 5,629,993 | A | 5/1997 | Smiley |
| 5,661,591 | A | 8/1997 | Lin et al. |
| 5,684,631 | A | 11/1997 | Greywall |
| 5,706,123 | A | 1/1998 | Miller et al. |
| 5,719,073 | A | 2/1998 | Shaw et al. |
| 5,750,420 | A | 5/1998 | Bono et al. |
| 5,761,350 | A | 6/1998 | Koh |
| 5,774,604 | A | 6/1998 | McDonald |
| 5,778,513 | A | 7/1998 | Miu et al. |
| 5,790,720 | A | 8/1998 | Marcuse et al. |
| 5,808,780 | A | 9/1998 | McDonald |
| 5,814,554 | A | 9/1998 | De Samber et al. |
| 5,858,622 | A | 1/1999 | Gearhart |
| 5,863,839 | A | 1/1999 | Olson et al. |
| 5,871,383 | A | 2/1999 | Levine et al. |
| 5,949,125 | A | 9/1999 | Meyer |
| 5,994,816 | A * | 11/1999 | Dhuler et al. ............... 310/307 |
| 6,108,466 | A | 8/2000 | Aksyuk et al. |
| 6,229,640 | B1 * | 5/2001 | Zhang ......................... 385/18 |
| 6,275,320 | B1 * | 8/2001 | Dhuler et al. ............... 359/237 |
| 6,360,033 | B1 * | 3/2002 | Lee et al. ..................... 385/18 |
| 6,363,183 | B1 * | 3/2002 | Koh ............................ 385/19 |
| 6,377,718 | B1 * | 4/2002 | Que et al. ...................... 385/3 |
| 6,388,359 | B1 * | 5/2002 | Duelli et al. ................ 310/309 |
| 6,415,068 | B1 * | 7/2002 | Sun ............................. 385/16 |
| 6,459,524 | B1 * | 10/2002 | Zhang et al. ................. 385/18 |
| 6,493,482 | B1 * | 12/2002 | Al-hemyari et al. .......... 385/19 |
| 6,504,968 | B1 * | 1/2003 | Zhu et al. ..................... 385/18 |

OTHER PUBLICATIONS

Document entitled "Mems Optical Inc. Micro–Electro–Mechanical Systems" printed from internet site www.memsoptical.com, Oct. 8, 1998, 6 pages.

Document entitled "UW–MEMS Patent Archive" printed from internet site www.mems.engr.wisc.edu, Oct. 8, 1998, 3 pages.

Document entitled "MEMS Fabrication Capabilities in various institutions and organizations" printed from internet site www.mems.isi.edu, Oct. 8, 1998, 5 pages.

Document entitled "Intelligent Cross–Bar Switch for Optical telecommunications based on Micro–Mirror Array" printed from internet site www.eptl..ch, Oct. 08, 1998, 7 pages.

Document entitled "Sandia National Laboratories Intelligent Micromachine Initiative, MEMS overview" printed from internet site www.mdl.sandia.gov, Oct. 8, 1998, 7 pages.

Document entitled "Sandia National Laboratories Intelligent Micromachine Initiative Image Gallery" printed from internet site www.mdl.sandia.gov, Oct. 8, 1998, 8 pages.

Document entitled "Sandia National Laboratories Intelligent Micromachine Initiative Technologies: Integrated Trench Technology" printed from internet site www.mdl.sandia.gov, Oct. 8, 1998, 3 pages.

Document entitled "MEMS (Micro–Electro–Mechanical–System) Project" printed from internet site www.mcc.com, Oct. 8, 1998, 4 pages.

Document entitled "What is MEMS?" printed from internet site www.elvisions.com, Oct. 8, 1998, 1 page.

Document entitled " Statement of Work (Exhibit P) MEMS Project to the Research and Development Agreement Sep. 2, 1998" printed from internet site www.mcc.com, Oct. 8, 1998, 8 pages.

Document entitled "Introduction to Microengineering" printed from internet site www.ee.surrey.ac.uk, Oct. 8, 1998, 13 pages.

Hunziker, W. et al., "Elliptically Lensed Polarisation Maintaining Fibres", *Electronics Letters*, vol. 28, No. 17, pp. 1654–1656 (Aug. 13, 1992).

Juan, W.–H. et al., "High–Aspect–Ratio Si Vertical Micromirror Arrays for Optical Switching", *J. Microelectromechanical Systems*, vol. 7, No. 2, pp. 207–212 (Jun. 1998).

Marxer, C. et al., "Vertical Mirrors Fabricated by Deep Reactive Ion Etching for Fiber–Optic Switching Applications", *J. Micrelectromechanical Systems*, vol. 6, No. 3, pp 277–284 (Sep. 1997).

Syms, R.R. A. et al., "Bulk micromachined silicon comb–drive electrostatic actuators with diode isolation", *Sensors and Actuators*, vol. 63, pp. 61–67 (1997).

Helin, P. et al., "Self Aligned Vertical Mirrors and V–Grooves Applied to a Self–Latching Matrix Switch for Optical Networks", *Micro Electro Mechanical Systems*, pp. 467–472 (2000).

Maekoba, H. et al, "Self–aligned vertical mirror and V–grooves applied to an optical–switch: modeling and optimization of bi–stable operation by electromagnetic actuation", *Sensors and Actuators*, vol. A87, issue 3 (Jan. 5, 2001).

Sorosiak, J., "Make Way for MEMS", *TechFocus*, www.f-pnmag.com (2000).

* cited by examiner

LATCHING APPARATUS FOR A MEMS OPTICAL SWITCH

FIELD OF THE INVENTION

The present invention relates to microelectromechanical devices. Specifically, the present invention relates to latching mechanisms for microelectromechanical devices.

BACKGROUND OF THE INVENTION

Relatively modern technology now enables microelectromechanical systems (MEMS) to be fabricated on semiconductor substrates, typically silicon substrates. These microelectromechanical systems typically have sizes on the order of microns and may be integrated with other electrical circuits on a common substrate. As a result, microelectromechanical systems have found their way into numerous applications across numerous disciplines. Illustrative MEMS applications include optical switching, inertial or pressure sensors, and biomedical devices, for example.

MEMS-based optical switches are used in a variety of applications for switching light waves between optical waveguides, such as fibers. Optical switches typically include a mirror coupled to one or more comb drive actuators which either moves the mirror into an optical path between optical fibers or pulls the mirror out of the optical path.

Prior devices, however, suffer numerous limitations. For instance, prior devices require power consumption in order to maintain the optical switch in a switched position. Power must be continuously supplied to the switch to avoid loss of signal. Therefore, even a brief power failure can interrupt the signal. In addition, because prior optical switches require power to maintain a switched position, they consume more power. Accordingly, there is a need for latching devices which can hold the moving parts of an optical switch in the switched position without continuous electric power.

A prior attempt to construct a latching device for a MEMS optical switch employed a permanent magnet, an iron yoke coupled to the permanent magnet, and wire coils wound around the iron yoke. The switch included a mirror mounted toward the end of a deflectable cantilever coated with gold. By applying current through the wire coils the cantilever would be magnetically drawn into contact with the iron yoke where it would remain due to the permanent magnet even after the flow of current through the coils ceased. By applying a reverse current through the coils the cantilever would be released from the yoke and return to a mechanically stable position. The device suffers from numerous drawbacks. For instance, the wire coils and yoke must be disposed in a layer outside the layer occupied by the optical paths. This increases the size of the switch and packaging complexity. Furthermore, the device is only good for bi-stable latching. That is, the device only has two stable positions, either in contact with the magnet or out of contact with the magnet.

Another attempt to construct a latching device for an optical switch used a mirror with an arrowhead-shaped tip. The device included opposed prongs for receiving the mirror tip therebetween. The opposed prongs were drawn together or pushed apart by a thermo-electric actuator. By sliding the tip of the mirror between the opposed prongs, the mirror would become secured in the switched position. To remove itself from the switched position, the thermo-electric actuator would cause the prongs to separate, thereby allowing the tip of the mirror to escape and return to its original position. This approach suffers from several drawbacks. As with the other prior art device described, the device is limited to bi-stable latching. In addition, the displacement distance of the mirror needs to be large to reach the latching position, undesirably increasing the driving power and switching time for the device. Furthermore, the thermo-electric actuator is itself a relatively slow driver, requiring on the order of 10 milliseconds to activate.

Accordingly, improvements in latching devices for MEMS-based devices such as optical switches are desired.

SUMMARY OF THE INVENTION

The present invention provides a latching device for a MEMS-based system, such as an optical switch. In accordance with one embodiment of the invention, a micro electromechanical system is formed on a substrate. The system includes a positionable member capable of being moved between at least two positions relative to the substrate. An actuator such as a comb drive actuator is provided which may include a stationary comb mounted on the substrate, a moveable comb interleaved with the stationary comb, and a beam connected between the substrate and the moveable comb. The actuator is coupled to a latching member so that the latching member can be moved between a first position and a second position. In the first position, the latching member engages the positionable member to prevent the positionable member from moving. In the second position, the latching member is disengaged from the positionable member to allow movement of the positionable member. The combs of the comb drive actuator deflect the beam to move the latching member from the first to the second position.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
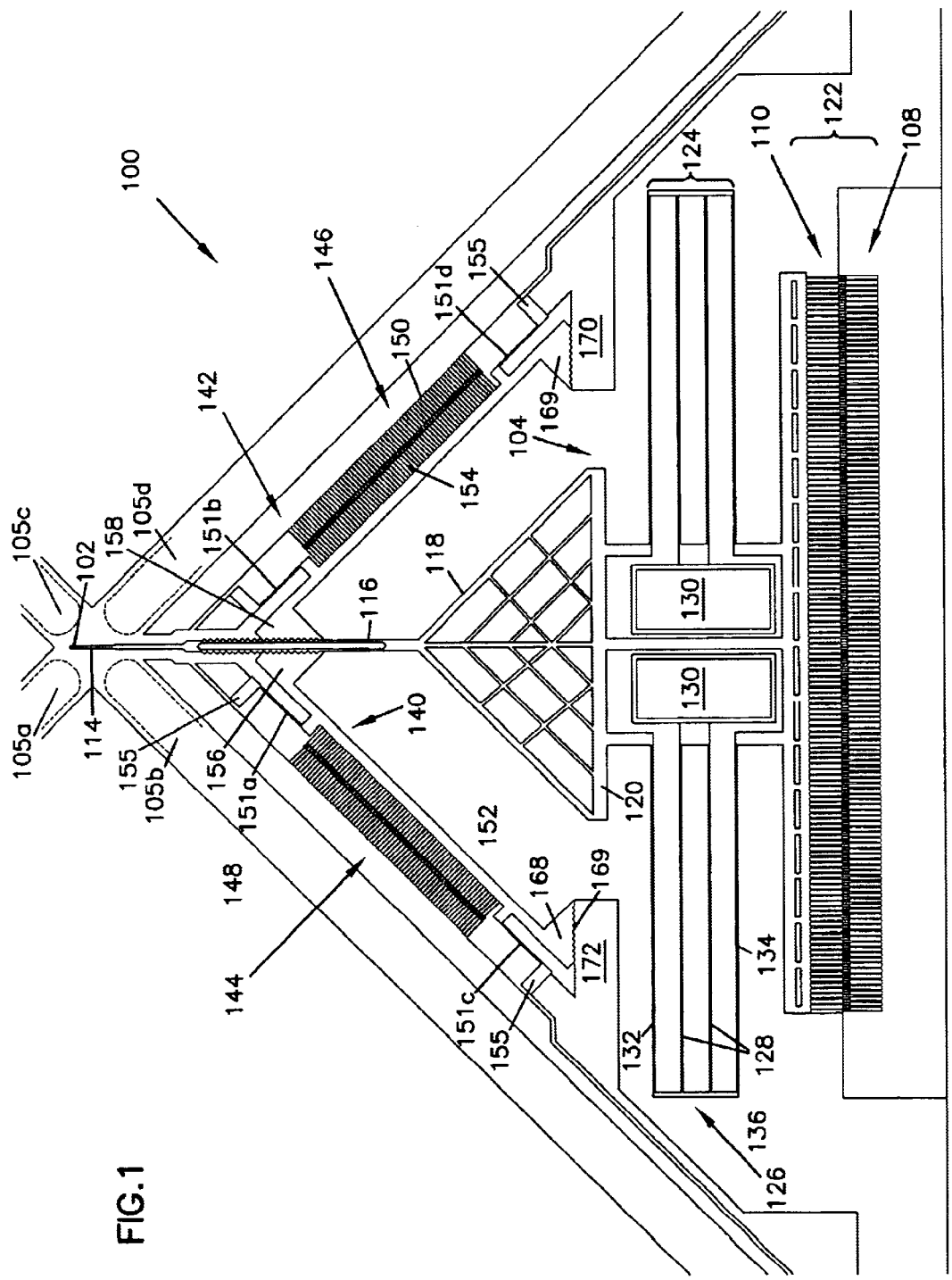
FIG. 1 illustrates a top view of an optical switch incorporating a latching device in accordance with one embodiment of the present invention, the optical switch is shown with a mirror in an extended position with latching members engaged.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention relates generally to microelectromechanical systems. The invention is particularly suited to MEMS-based systems with moving parts such as optical switches and variable optical attenuators. MEMS-based optical switches rely on repositioning mirrors in order to alter the path of optical signals. While the present invention is not so limited, an appreciation of various aspects of the invention will be gained through an understanding of the examples provided below.

FIG. 1 illustrates a top view of an exemplary optical switch incorporating a latching device in accordance with an embodiment of the invention. All of the features of the optical switch 100 generally reside in an upper layer of a substrate. For ease of illustration, the optical switch 100 is not shown to scale. A short description of the workings of the optical switch follows, after which the details of the present invention will be described.

The optical switch 100 generally includes a mirror 102 coupled to an actuator 104 capable of moving the mirror 102 between an extended position (e.g., FIG. 1) interposed between optical waveguides 105 (shown in dashed lines) and a retracted position (e.g., FIG. 5) apart from the waveguides. In the example embodiment, when the mirror 102 lies in the extended position, light waves reflect off the mirror 102 to couple between waveguides 105a and 105b and 105c and 105d without transmitting between opposing waveguides 105a, 105d and 105b, 105c. When the mirror 102 lies in the retracted position, switching occurs such that light waves couple between waveguides 105a and 105d and waveguides 105b and 105c without reflecting off the mirror 102. As used herein, the term waveguide is intended to cover any medium which transmits light, including, e.g., optical fibers.

The mirror 102 is typically disposed in a trench. The trench typically has a width sufficient to prevent the mirror 102 from contacting sidewalls of the trench during operation. Typical, trench widths (from sidewall to sidewall) range from 40 to 50 microns for many applications. The mirror 102 typically includes a narrow wall 114 having a reflective coating on each side, mounted on an elongated base support 116 which couples the narrow mirror wall to the actuator 104. The mirror wall 114 may have a thickness or width of about 2–5 microns for many applications. This leaves an opening between the narrow wall sides and the trench sidewalls of about 20 to 25 microns in many cases. The elongated base support 116 typically is wider than the wall 114 in order to provide stability to the mirror 102 during operation. In this embodiment, the optical switch 100 further includes a support structure 118 mounted between the base support 116 for the mirror 102 and a base element 120 of the actuator 104. In the example embodiment, the support structure 118 is a lattice work structure having lines which run at angles relative to the base element 120 and the base support 116 for the mirror 102. The support structure 118 advantageously provides additional stability to the mirror 102 as it switches between its extended and retracted positions.

The mirror wall 114 typically includes smooth and vertical sidewalls. For example, the sidewalls of the mirror wall 114 typically have a surface roughness of about 30 nm rms or less and a verticality of about 90°±0.6° or better (e.g., 90°±0.5°, 90°±0.4°, 90°±0.3° or better). Techniques for forming sidewalls with such characteristics are discussed in U.S. patent application Ser. No. 09/372,265 entitled, "Microelectromechanical Optical Switch and Method of Manufacture Thereof" which is hereby incorporated by reference.

The illustrated actuator 104 includes a drive mechanism 122 capable of applying a force which moves the mirror 102 to the retracted position and a beam structure 124 which deflects during the application of force and which returns the mirror to the extended position in the absence of the application of force by the drive mechanism 122. The beam structure 124 typically acts as a spring, deflecting in the presence of force between the combs and returning to an original position in the absence of force. In the illustrated embodiment, the beam structure 124 stores zero energy when the mirror lies in the extended position. In the example embodiment, the drive mechanism 122 is a single comb drive, which includes a stationary comb 108 interleaved with a movable comb 110 for providing the force driving the actuator 104 and thus the mirror 102 between its extended and retracted positions. The longitudinal displacement of the mirror 102 between its extended and retracted positions typically ranges from about 40 to 70 microns or more.

A voltage differential is applied between the two combs 108 and 110 thus creating a force which attracts the two combs 108 and 110 to one another and retracts the mirror 102 from its extended position between the waveguides to its retracted position apart from the waveguides. The tightly-packed and smooth comb fingers can apply a force which switches the mirror between its extended and retracted position preferrably in about 0.2 to 1 milliseconds. Advantageously, features of the actuator enable the mirror to be displaced a relatively long distance with little deflection in a transverse direction. For example, the lattice support structure and the folded beam structure both serve to reduce transverse deflection and resonation of the mirror.

Each of the comb fingers typically has a width ranging from about 2 to 4 microns and, in the exemplary embodiment, has a width of about 3 microns. The two combs 108 and 110 are also tightly spaced. For example, the gap between adjacent comb fingers typically ranges from about 2 to 4 microns and, in the exemplary embodiment, is about 3 microns. In the illustrated embodiment, the individual fingers each have relatively vertical (e.g., verticality of at least 90°±0.6°) and smooth (surface roughness of about 30 nm rms or less) sidewalls. The smoothness of the fingers allows for tightly-packed formation of the interleaved combs. This enables the size of the structure to be scaled down for a given applied force. Accordingly, this allows smaller switches to be developed while maintaining or reducing switching speeds. The length of each finger of the combs, the overlap in the absence of force (shown in FIG. 1) between the two combs 108 and 110, and the number of fingers on each comb 108, 110 is typically selected in consideration of the desired force developed between the two combs 108 and 110 as well as the desired travel distance of the mirror 102 between its extended and retracted positions. The fingers may have a length ranging from about 90 to 110 microns and the combs have an overlap of about 20 to 30 microns. The number of fingers on each comb 108, 110 can vary and may range from about 120 to 160 for many applications.

The illustrated beam structure 124 includes a double folded beam 126 on each side of the actuator 104. As the double folded beams 126 in the exemplary embodiment are symmetrical, only one will be described in the discussion which follows. The double folded beam 126 includes inner beams 128 attached at a first end to a fixed substrate structure 130 and first and second outer beams 132 and 134. The first outer beam 132 couples at one end with ends of the other beams by end piece 136 and at the other end with the actuator base surface 120. The second outer beam 134 couples at one end to the other beams by end piece 136 and at the other end to the movable comb 110. Beneath the fixed substrate structure 130, the buried insulating layer remains, fixing this structure to the substrate. The beams 132 and 134 and end piece 136 are free from the insulating, allowing the features to move with the moveable comb. During operation, the folded beams 126 acts as a spring, deflecting when the mirror 102 is moved to its retracted position and returning the mirror 102 to an extended position in the absence of force between the combs 108, 110. While not shown to scale, the length of each beam 126 (measured from an axis aligned with the mirror 102 to the outer ends of the beams) may range from about 700 to 1000 microns for many applications.

One or more features of the beam structure 124 (e.g., inner beams 128, outer beams 132 and 134, and/or end piece 136) have relatively vertical sidewalls and smooth surfaces. For example, verticality of the sidewalls may be about 90°±0.6° or better with surface roughness of about 30 nm rms or less. By increasing the verticality and decreasing the roughness of the sidewalls, the strength of the beam structure 124 can be increased. This enables, for example, the lifetime of the beam structure to be increased, the deflection distance of the beams to be increased, and/or the size of the structure to be reduced. In the illustrated embodiment, the features of the beams allows the formation of a relatively compact optical switch having of a single comb drive actuator, relative large mirror displacement, and short switching speeds.

The present invention relates to incorporating a latching device into a MEMS-based system having a positionable member such as mirror 102 in the optical switch 100 just described. The mirror 102 and base support 116 may be disposed in and transitioned between one or more of a plurality of positions and therefore is positionable. Optical switch 100 includes latching devices 140 and 142. Latching devices hold the positionable member (mirror 102 and base support 116) in any selected position without requiring electrical power to maintain the position.

Latching devices 140 and 142 include drive actuators shown as comb drive actuators 144 and 146 having stationary combs 148 and 150 mounted on the substrate and moveable combs 152 and 154 interleaved with the stationary combs 148 and 150, respectively. Beams 151a, 151b, 151c, and 151d connect the moveable combs 152 and 154 to stationary members 155. Stationary members 155 are fixed to the substrate.

Figure 2:
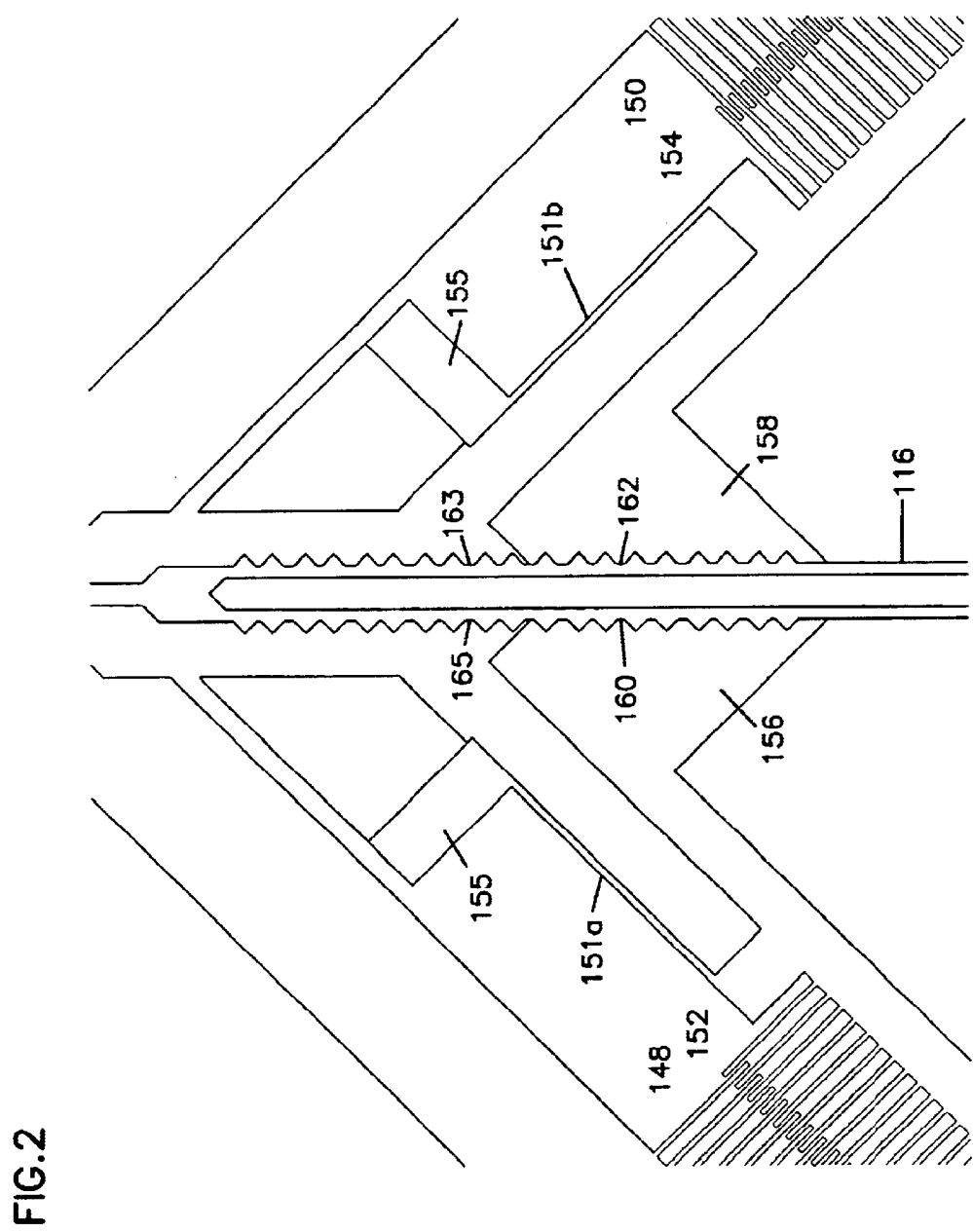
FIG. 2 illustrates a detailed view of a first portion of the latching device of FIG. 1.

FIG. 2 illustrates a detailed view of a first portion of the latching device of FIG. 1. Latching devices 140 and 142 include latching members 156 and 158. Latching members 156 and 158 are coupled to the moveable combs 152 and 154. Latching members 156 and 158 move with the moveable combs 152 and 154 between extended and retracted positions. In the extended position, the latching members 156 and 158 engage the base support 116 and prevent the base support 116 from moving. In the retracted position, latching members 156 and 158 disengage the base support 116 allowing the base support 116 to move.

The beam structures 151a, 151b, 151c, and 151d bias the latching members into the extended position. Therefore, no electric power is needed to maintain the latching members 156 and 158 in the extended position. Electric power need be supplied to the comb actuators 144 and 146 only when it is desired to transition the base support 116 between positions.

Latching members 156 and 158 include engaging surfaces 160 and 162. When the latching members 156 and 158 are in the extended position, engaging surfaces 160 and 162 abut opposite sides of base support 116 to prevent the base support 116 and mirror 102 from moving. The engaging surfaces 160 and 162 may be contoured to correspond to contoured surfaces 163 and 165 of the base support 116. The corresponding contoured surfaces 160, 162, 163 and 165 assist in preventing movement of the base support 116 when the latching members 156 and 158 are in their extended positions. Engaging surfaces 160 and 162 are set at an angle relative to the direction of movement of the moveable comb 154.

Beams 151a, 151b, 151c, and 151d act as springs, deflecting in the presence of force between the actuator combs and returning to an original position in the absence of force. When comb actuators 144 and 146 are activated, beam members 151a, 151b, 151c, and 151d are deflected and latching members 156 and 158 are moved into a retracted position (shown in FIG. 4) in which engaging surfaces 160 and 162 disengage the base support member 116. With the latching members 156 and 158 in the retracted position, the base support 116 and mirror 102 may be transitioned between extended and retracted positions. When comb actuators 144 and 146 are deactivated, beams 151a, 151b, 151c, and 151d reposition latching members 156 and 158 to their extended position so that the engaging surfaces 160 and 162 engage the base support 116 to prevent movement of base support 116.

Figure 3:
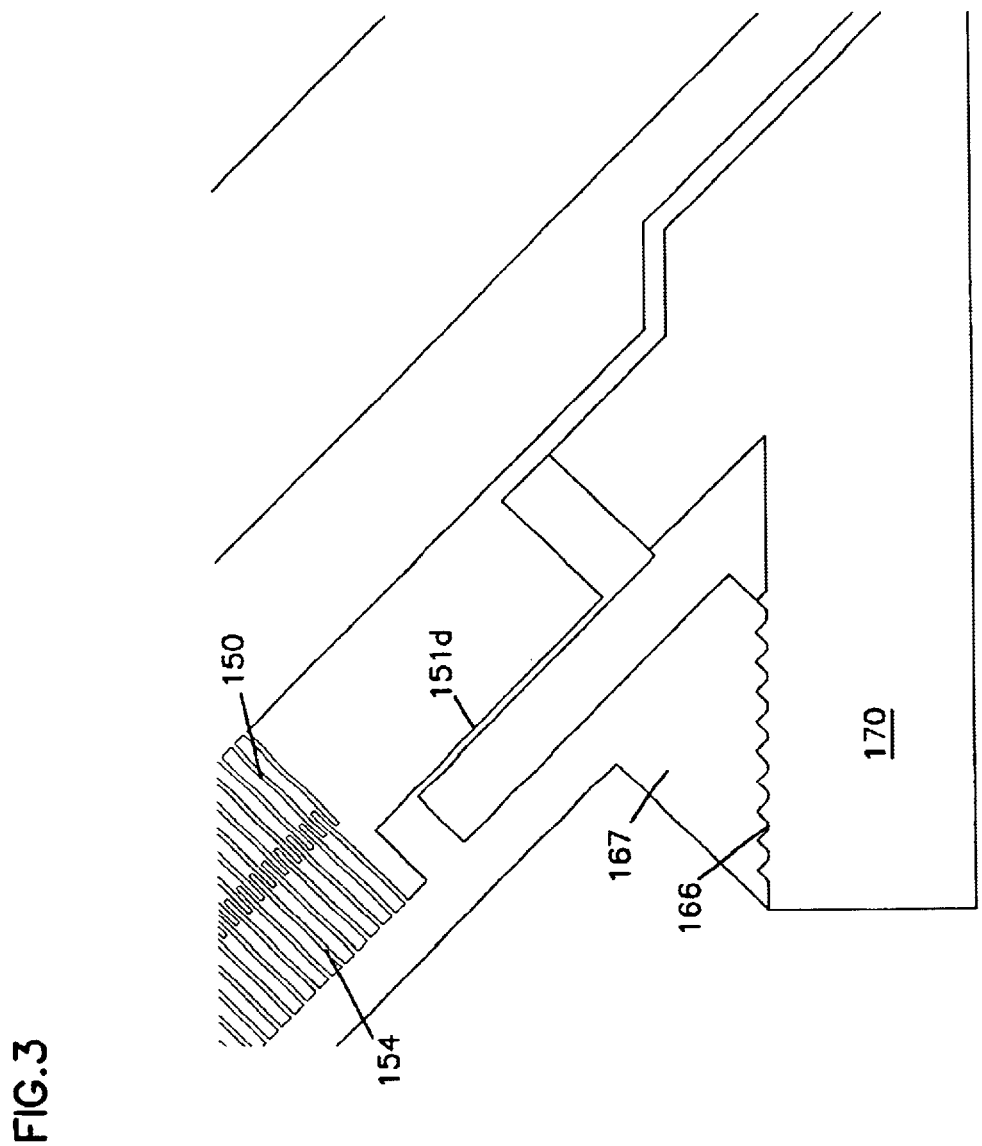
FIG. 3 illustrates a detailed view of a second portion of the latching device of FIG. 1.

In the illustrated embodiment of FIG. 1, engaging surfaces 160 and 162 of latching members 156 and 158 are set at a 45 degree angle relative to the direction of movement of the latching members 156 and 158. Latching devices 140 and 142 include stabilizing members 167 and 168. As shown in the detailed view of FIG. 3, stabilizing members 167 and 168 are secured to the moveable combs 152 and 154. The stabilizing members 167 and 168 include engaging surfaces 166 and 169 which engage stationary members 170 and 172. Stationary members 170 and 172 are secured to the substrate. The stabilizing members 167 and 168 engage the stationary members 170 and 172 when the latching members are in the extended position which assists in maintaining the latching members 156 and 158 in correct orientation.

Figure 4:
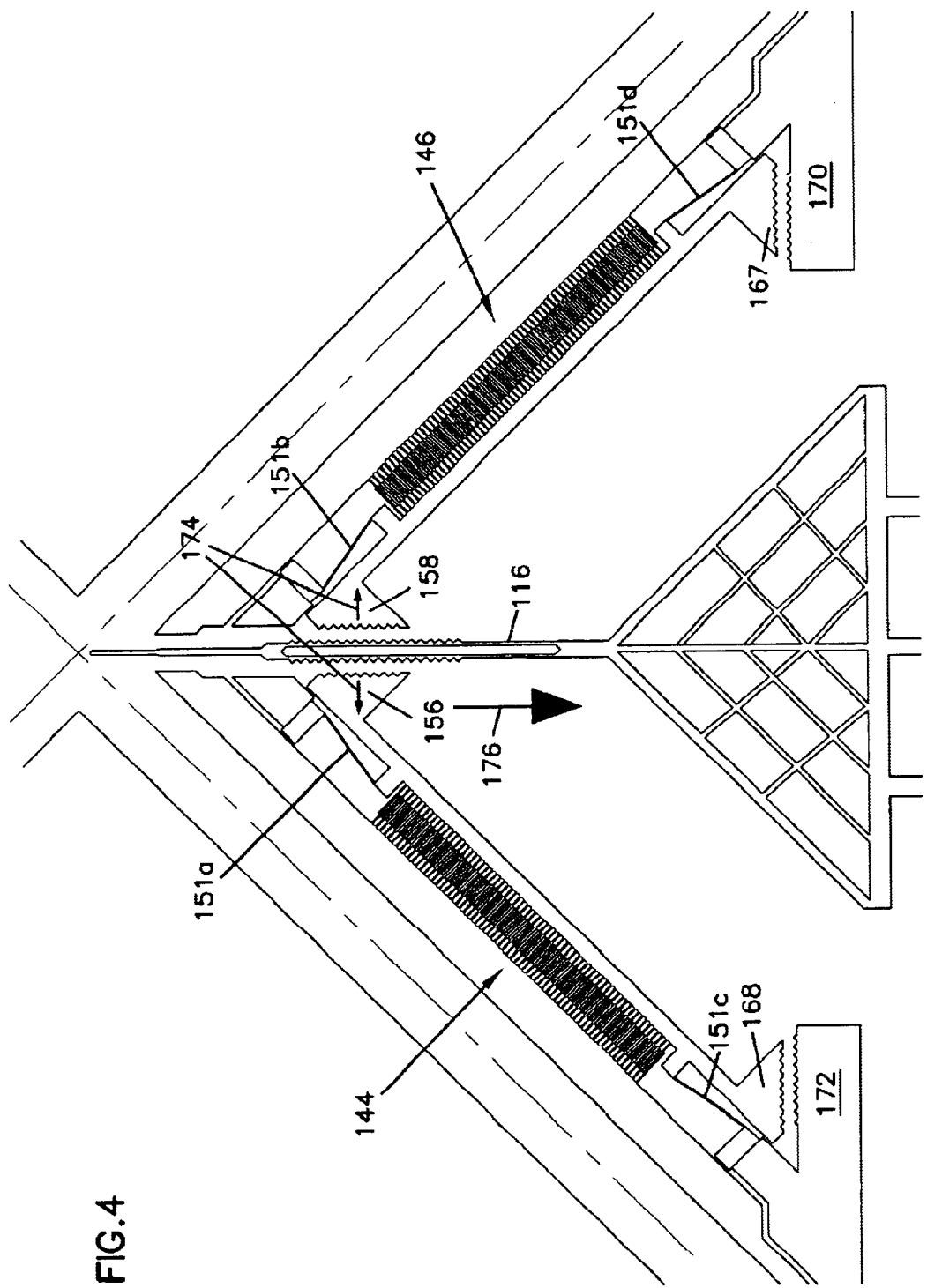
FIG. 4 illustrates a partial top view of the latching device of FIG. 1 with latching members disengaged and the mirror in a partially retracted position.

FIG. 4 illustrates the comb actuators 144 and 146 in an activated state. The comb actuators 144 and 146 have applied a force deflecting beams 151a, 151b, 151c, and 151d and pulling the latching members 156 and 158 to their retracted positions disengaged from the base support 116. Stabilizing members 167 and 168 have also disengaged the stationary members 170 and 172. Arrows 174 indicate the separation of the latching members 156 and 158 away from the base support 116. Arrow 176 indicates the direction of travel of base support 116 once the latching members 156 and 158 are disengaged from the base support 116.

Figure 5:
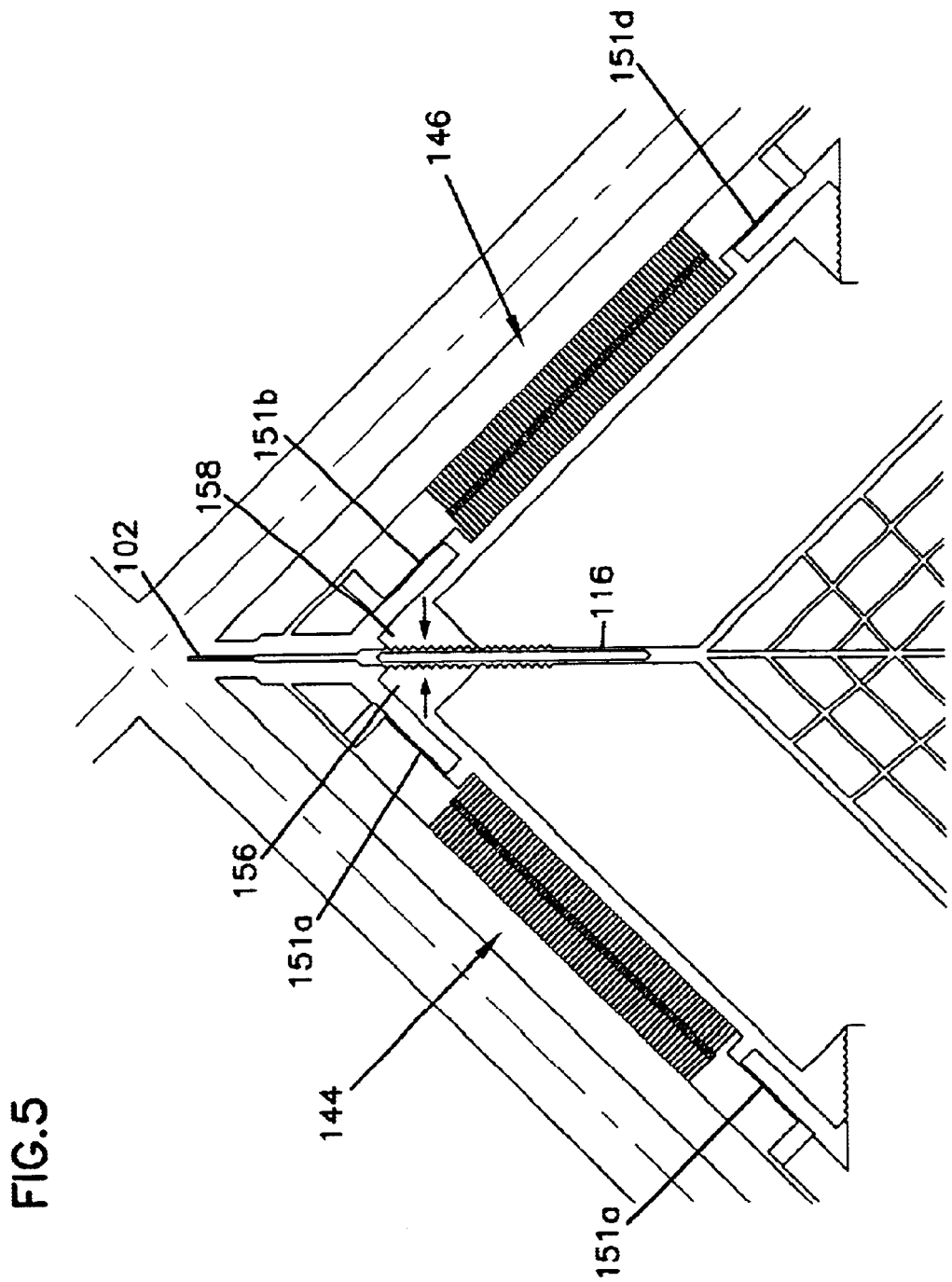
FIG. 5 is a partial top view of the latching device of FIG. 1 with latching members engaged and the mirror in a retracted position.
Figure 6:
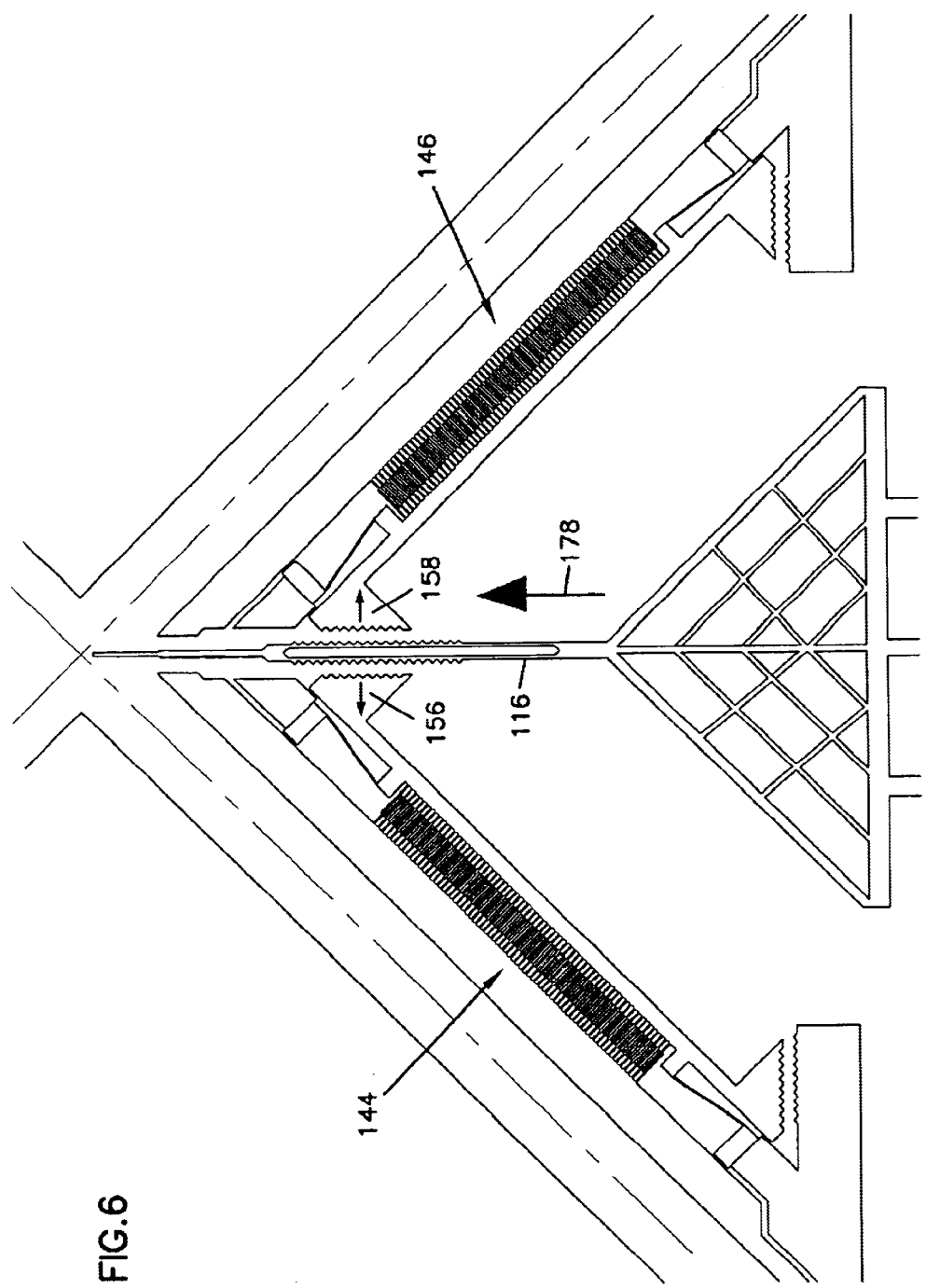
FIG. 6 is a partial top view of the latching device of FIG. 1 with latching members disengaged and the mirror in a partially extended position.

FIG. 5 illustrates the latching members 156 and 158 returned to their extended positions engaging base support 116. The base support 116 and mirror 102 are in their retracted position apart from waveguides 105. To return the base support 116 and mirror 102 to their extended position, the latching members 156 and 158 are retracted (as shown in FIG. 6) by activation of comb actuators 144 and 146, and base support 116 is allowed to move in the direction of arrow 178 toward the extended position.

The present invention may be used in MEMS-based systems to achieve multiple position latching. That is, it is not limited to achieving only bi-stable latching. The positionable member may be held in numerous different positions by the latching members of the present invention. Furthermore, variations and modifications to the example shown in the Figures will readily occur to one of skill in the art. For example, the comb actuators 144 and 146 are only included as examples and are not intended to limit the scope of the invention. Comb actuators 144 and 146 could be replaced with other actuators for example, thermo-electric acutators or PZT (piezoelectric) actuators.

Figure 7:
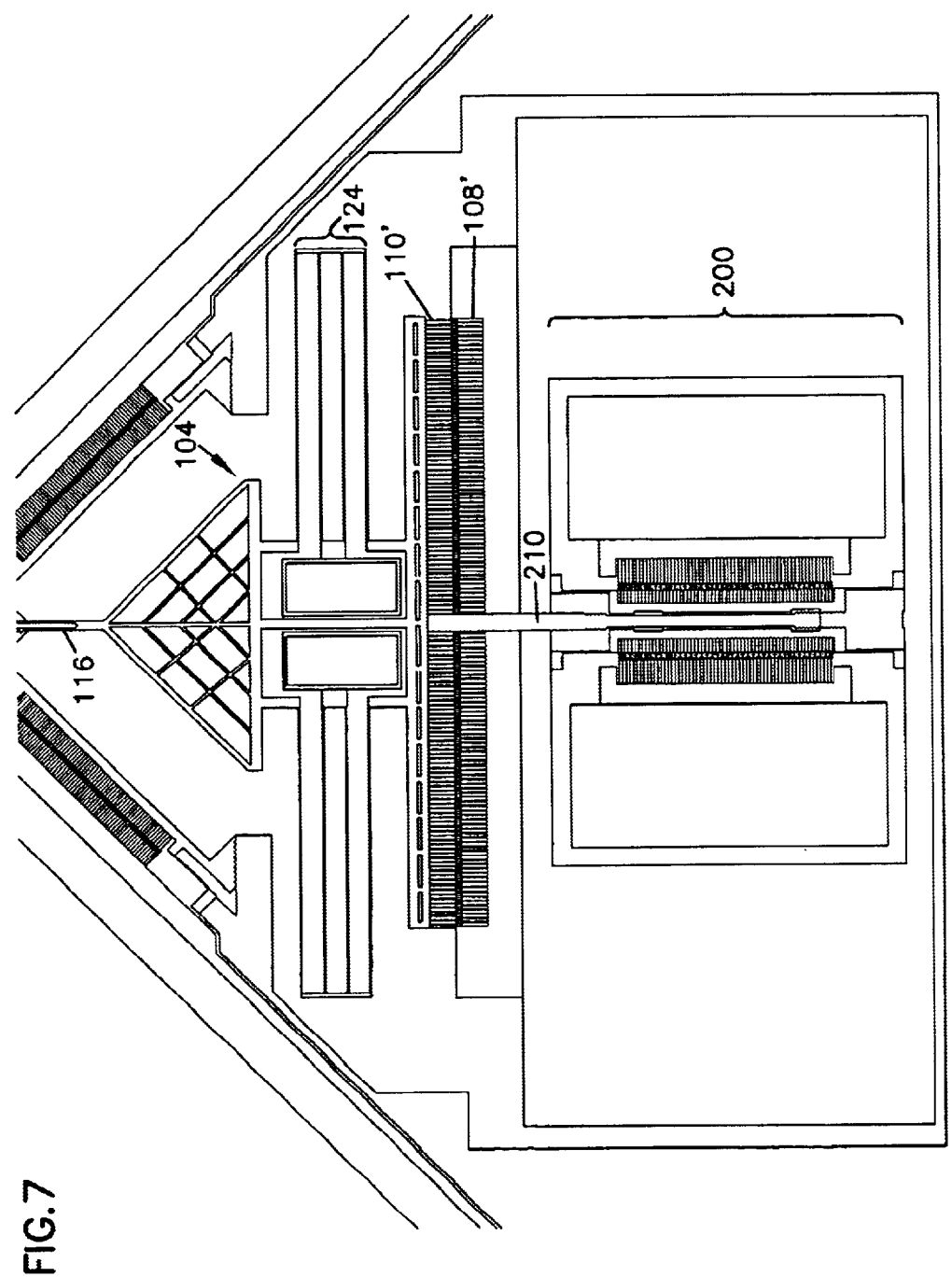
FIG. 7 illustrates a top view of an optical switch incorporating an alternative embodiment of a latching device in accordance with the present invention.

FIG. 7 illustrates an alternative embodiment of a latching device 200 in accordance with the present invention. The latching device 200 is incorporated into an optical switch including a base support 116, mirror (not shown) and actuator 104 having stationary comb 108' and moveable comb 110'. Coupled to the moveable comb 110' is a base post 210. Base post 210 moves with base support 116 between extended and retracted positions by action of the interleaved combs 108' and 110' and the beam structure 124. The base post 210 is shown in the extended position.

Figure 8:
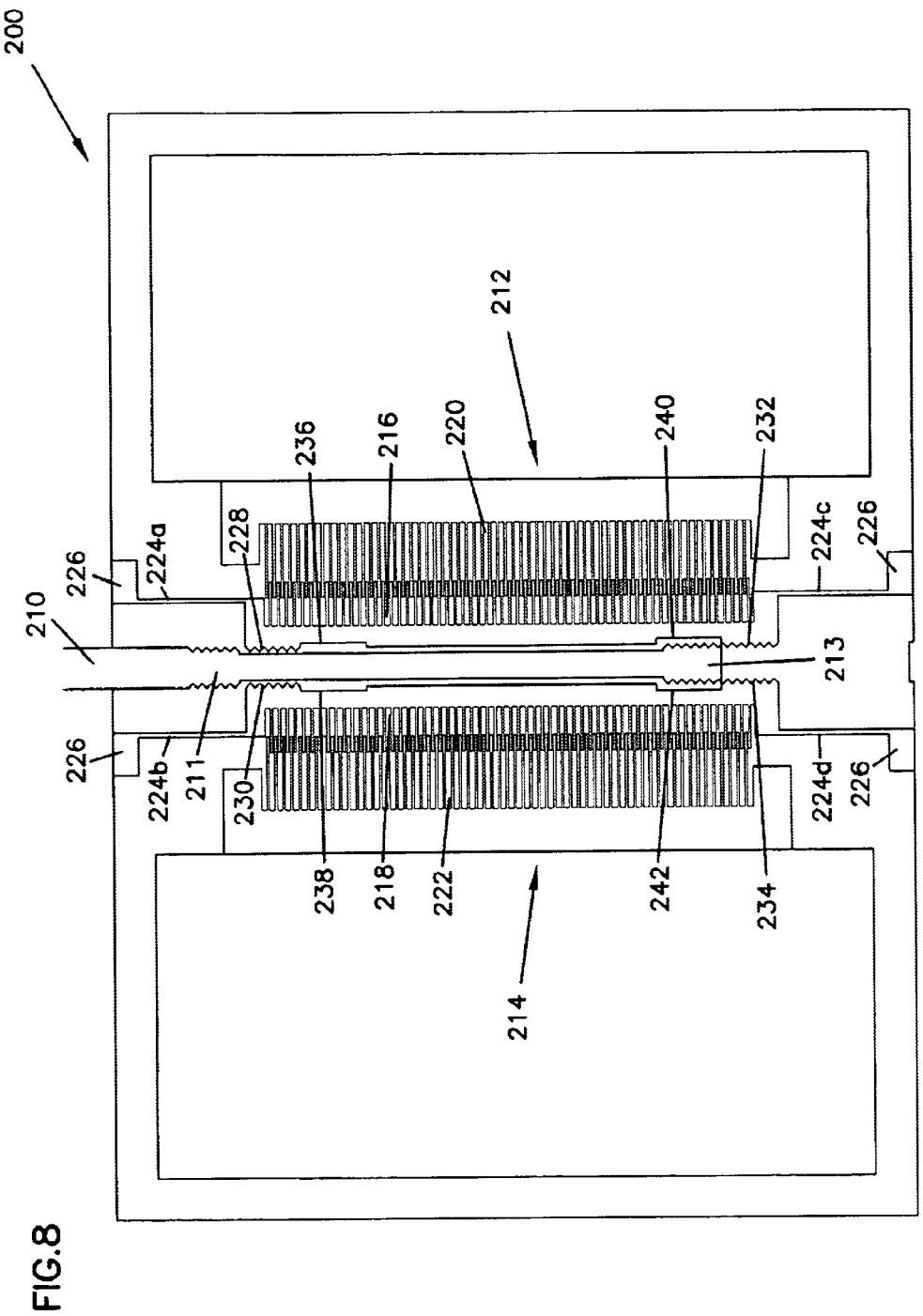
FIG. 8 is a detailed view of the alternative embodiment latching device shown in FIG. 7.

FIG. 8 is a detailed view of the alternative embodiment latching device 200 shown in FIG. 7. The latching device 200 includes comb actuators 212 and 214. Each comb actuator 212 and 214 includes a moveable comb 216 and 218 interleaved with a stationary comb 220 and 222. Beams 224a, 224b, 224c, and 224d connect the moveable combs 216 and 218 to stationary members 226 fixed to the substrate. The latching device 200 includes engagement surfaces 228, 230, 232, and 234.

Base post 210, base support 116 and mirror are held in the extended position by beam structure 124. Latching device 200 holds the base post 210, base support 116 and mirror in the retracted position by gripping the base post 210 between engagement surfaces 228, 230, 232, and 234. Comb actuators 212 and 214 retract the engagement surfaces 228, 230, 232, and 234 in order to allow the base post 210 to transition between extended and retracted positions.

Portions 211 and 213 of base post 210 may be made wider than the distance between engagement surfaces 228 and 230 and engagement surfaces 232 and 234 when the beams 224a, 224b, 224c, and 224d store zero energy. In this way when the base post 210 is retracted and portions 211 and 213 are held between the engagement surfaces, the beams will remain partially deflected. The beams being in a partially deflected state will supply a constant holding force on the base post 210.

The latching device 200 also defines recesses 236, 238, 240 and 242. The recesses allow the wider portion 213 of base post 210 to avoid engaging surfaces 232 and 234 when the base post 210 occupies an extended position.

Figure 9:
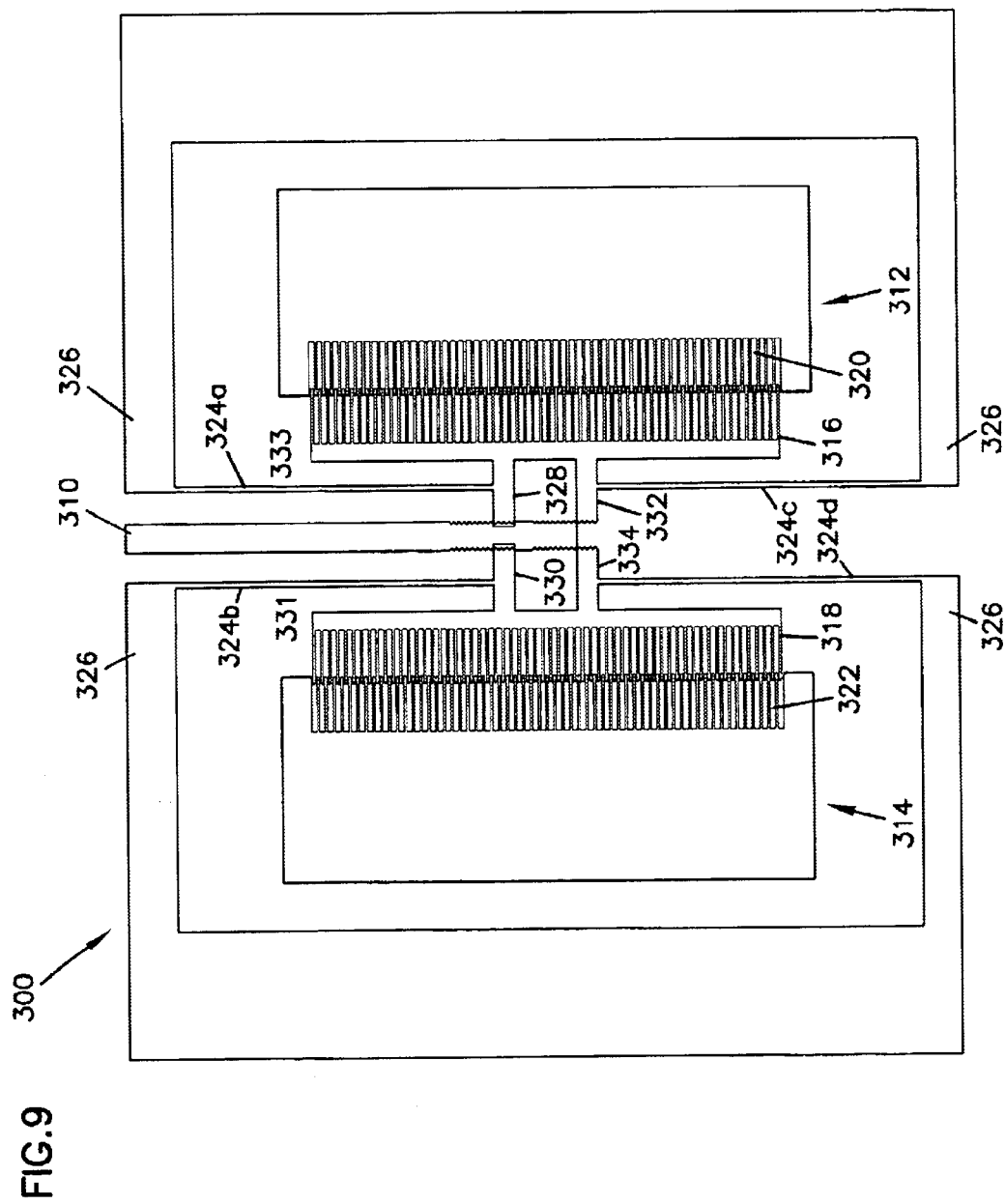
FIG. 9 illustrates a top view of another alternative embodiment of a latching device in accordance with the present invention.

A third embodiment of a latching device 300 in accordance with the present invention is shown in FIG. 9. The latching device 300 includes a base post 310 which it is to be understood is positionable in an extended position and a retracted position by means of, for instance, a comb actuator (not shown).

Latching device 300 includes comb actuators 312 and 314. Each comb actuator 312 and 314 includes a moveable comb 316 and 318 interleaved with a stationary comb 320 and 322, respectively. The latching device 300 includes engagement members 328, 330, 332, and 334 extending from the moveable combs 316 and 318. Beams 324a, 324b, 324c, and 324d connect the engagement members 328, 330, 332, and 334 to stationary members 326 fixed to the substrate. Beams 324a, 324b, 324c, and 324d act as springs, deflecting in the presence of force between the actuator combs and returning to an original position in the absence of force.

Base post 310, which is a positionable member, defines recesses 331 and 333 for receiving engaging members 328 and 330. Comb actuators 312 and 314 retract the engagement members 328, 330, 332, and 334 in order to allow the base post 310 to transition between extended and retracted positions. Latching device 300 holds the base post 310 in a desired position either by gripping the base post 310 between engagement members 328, 330, 332, and 334 or by inserting engagement members 330 and 328 into recesses 331 and 333 as shown in FIG. 9.

While the preferred embodiments of the present invention have described the positionable member being in either an extended or retracted position, it is to be understood that the retracted and extended positions may be multiple retracted or extended positions and the present invention is not limited to bi-stable latching. For example, the present invention is well suited for use in variable optical attenuators which have positionable elements with more than two positions.

It should be noted that the illustrated optical switch is provided by way of example and not of limitation. Other optical switches or other MEMS-based systems may incorporate the preferred embodiment of the invention. Accordingly, the present invention should not be considered limited to the particular examples described above, but rather should be understood to cover all aspects of the invention as fairly set out in the attached claims. Various modifications and numerous structures to which the present invention may be applicable will be readily apparent to those of skill in the art to which the present invention is directed upon review of the present specification. The claims are intended to cover such modifications and devices.

What is claimed is:

1. A latching device for a micro electro-mechanical system formed on a substrate, the device comprising:

a positionable member capable of being moved between at least two positions relative to the substrate;

an actuator coupled to the substrate; and a latching member coupled to the actuator, the latching member capable of being moved by the actuator between a first position wherein the latching member engages the positionable member preventing movement of the positionable member and a second position disengaged from the positionable member allowing movement of the positionable member;

wherein the actuator applies a force capable of moving the latching member from the first position to the second position; and wherein the latching device includes a deflectable beam coupling the latching member to the substrate, the force of the actuator deflects the beam, and the beam returns the latching member to the first position in the absence of the application of force.

2. The latching device of claim 1, wherein the latching member includes a first engaging surface, the first engaging surface engaging the positionable member when the latching member is in its first position, the latching member further including a second engaging surface, the second engaging surface engaging a stationary member when the latching member is in its first position, the stationary member being fixed to the substrate.

3. The latching device of claim 1 wherein the latching member includes a contoured surface, and wherein the positionable member includes a corresponding contoured surface to be engaged by the contoured surface of the latching member when the latching member is in the first position.

4. A latching device for a micro electro-mechanical system formed on a substrate, the device comprising:
  a positionable member capable of being moved between at least two positions relative to the substrate;
  a comb drive actuator including a stationary comb mounted on the substrate, a moveable comb interleaved with the stationary comb, and a beam connected between the substrate and the moveable comb; and
  a latching member coupled to the comb drive actuator, the latching member capable of being moved between a first position wherein the latching member engages the positionable member preventing movement of the positionable member and a second position disengaged from the positionable member allowing movement of the positionable member;
  wherein the combs of the comb drive actuator apply a force capable of deflecting the beam and moving the latching member from the first position to the second position.

5. The latching device of claim 4 wherein the beam returns the latching member to the first position in the absence of the application of force between the combs.

6. The latching device of claim 5 wherein the latching member includes a first engaging surface, the first engaging surface engaging the positionable member when the latching member is in its first position, the latching member further including a second engaging surface, the second engaging surface engaging a stationary member when the latching member is in its first position, the stationary member being fixed to the substrate.

7. The latching device of claim 5 wherein the beam biases the latching member against the positionable member when the latching member is in its first position.

8. The latching device of claim 4 wherein the positionable member defines a recess to receive the latching member when the latching member is in its first position.

9. The latching device of claim 4 wherein the latching member includes a contoured surface, and wherein the positionable member includes a corresponding contoured surface to be engaged by the contoured surface of the latching member when the latching member is in the first position.

10. The latching device of claim 9 wherein the contoured surface of the latching member is set at an angle relative to the direction of movement of the moveable comb.

11. The latching device of claim 4 wherein the comb drive actuator is a first comb drive actuator and the latching member is a first latching member, and wherein the latching device further comprises:
  a second comb drive actuator including a stationary comb mounted on the substrate, a moveable comb interleaved with the stationary comb, and a beam connected between the substrate and the moveable comb;
  a second latching member coupled to the comb drive actuator, the latching member capable of being moved between a first position wherein the latching member engages the positionable member preventing movement of the positionable member and a second position disengaged from the positionable member allowing movement of the positionable member;
  wherein the first latching member and the second latching member engage opposite sides of the positionable member when the latching members are in their respective first positions so that the positionable member is held between the first and second latching members.

12. The latching device of claim 11 wherein the beams return the latching members to their respective first positions in the absence of the application of force between the combs of the first and second comb drive actuators.

13. The latching device of claim 12 wherein the first and second latching members include a contoured surface, and wherein the positionable member includes a corresponding contoured surface to be engaged by the contoured surfaces of the first and second latching members when the latching members are in the their respective first positions.

14. The latching device of claim 4 wherein the positionable member includes a mirror.

15. A latching device for an optical switch formed on a substrate, comprising:
  a minor coupled to a base, the minor and base capable of being moved between an extended position end a retracted position;
  a first comb drive actuator including a stationary comb mounted on the substrate, a movable comb interleaved with the stationary comb, and a beam connected between the substrate and the moveable comb;
  a first latching member coupled to the first comb drive actuator, the first latching member capable of being moved between a first position wherein the first latching member engages the base and a second position disengaged from the base;
  a second comb drive actuator including a stationary comb mounted on the substrate, a movable comb interleaved with the stationary comb, and a beam connected between the substrate and the moveable comb;
  a second latching member coupled to the second comb drive actuator, the second latching member capable of being moved between a first position wherein the second latching member engages the base and a second position disengaged from the base;
  wherein the combs of the first and second comb drive actuators apply a force capable of deflecting the beams and moving the first and second latching members from their respective first positions to their second positions;
  wherein the beams return the first and second latching members to their respective first positions in the absence of the application of force between the combs;
  wherein the first latching member and the second latching member engage opposite sides of the base when the latching members are in their respective first positions so that the base is held between the first and second latching members.

16. The latching device of claim 15 wherein the first and second latching members include a contoured surface, and wherein the base includes first and second corresponding contoured surfaces to be engaged by the contoured surfaces of the first end second latching members when the latching members are in the their respective first positions.

17. A latching device for a micro electro-mechanical system formed on a substrate, the device comprising:
  a positionable member capable of being moved between at least two positions relative to the substrate;

a comb drive actuator including a stationary comb mounted on the substrate, a moveable comb interleaved with the stationary comb, and a beam connected between the substrate and the moveable comb; and a means for latching the positionable member coupled to the comb drive actuator, the means for latching capable of being moved between a first position wherein the means for latching engages the positionable member preventing movement of the positionable member and a second position disengaged from the positionable member snowing movement of the positionable member;

wherein the combs of the comb drive actuator apply a force capable of deflecting the beam and moving the means for latching from the first position to the second position.

18. The latching device of claim 17 wherein the beam returns the latching means for latching to the first position in the absence of the application of force between the combs.

19. The latching device of claim 18 wherein the means for latching includes a first aging surface, the first engaging surface engaging the positionable member when the means for latching is in its first position, the means for latching further including a second engaging surface, the second engaging surface engaging a stationary member when the means for latching is in its first position, the stationary member being fixed to the substrate.

20. The latching device of claim 18 wherein the beam biases the means for latching against the positionable member when the moms for latching is in its first position.

21. The latching device of claim 17 wherein the positionable member defines a recess to receive the means for latching when the means for latching is in its first position.

22. The latching device of claim 17 wherein the means for latching includes a contoured surface, and wherein the positionable member includes a corresponding contoured surface to be engaged by the contoured surface of the means for latching when the means for latching is in the first position.

23. The latching device of claim 22 wherein the contoured surface of the means for latching is set at an angle relative to the direction of movement of the moveable comb.

24. The latching device of claim 17 wherein the comb drive actuator is a first comb drive actuator and the means for latching is a first means for latching, and wherein the latching device further comprises:

a second comb drive actuator including a stationary comb mounted on the substrate, a moveable comb interleaved with the stationary comb, and a beam connected between the substrate and the moveable comb;

a second means for latching coupled to the comb drive actuator, the second means for latching capable of being moved between a first position wherein the means for latching engages the positionable member preventing movement of the positionable member and a second position disengaged from the positionable member allowing movement of the positionable member;

wherein the first means for latching and the second means for latching engage opposite sides of the positionable member when the means for latching are in their respective first positions so that the positionable member is held between the first and second means for latching.

25. The latching device of claim 24 wherein the beams return the means for latching to their respective first positions in the absence of the application of force between the combs of the first and second comb drive actuators.

26. The latching device of claim 25 wherein the first and second means for latching include a contoured surface, and wherein the positionable member includes a corresponding contoured surface to be engaged by the contoured surfaces of the first and second means for latching when the mean, for latching are in the their respective first positions.

27. The latching device of claim 17 wherein the positionable member includes a mirror.

28. A latching device for a micro electro-mechanical system formed on a substrate, the device comprising:

a positionable member capable of being moved between at least two positions relative to the substrate;

an actuator coupled to the substrate; and a latching member coupled to the actuator, the latching member capable of being moved by the actuator between a first position wherein the latching member engages the positionable member preventing movement of the positionable member and a second position disengaged from the positionable member allowing movement of the positionable member; wherein the actuator applies a force capable of moving the latching member from the first position to the second position;

wherein the latching member includes a contoured surface, and wherein the positionable member includes corresponding contoured surface to be engaged by the contoured surface of the latching member when the latching member is in the first position.

* * * * *

UNITED STATES PATENT AND TRADEMARK OFFICE
CERTIFICATE OF CORRECTION

PATENT NO.    : 6,801,682 B2
DATED         : October 5, 2004
INVENTOR(S)   : Zhang et al.

It is certified that error appears in the above-identified patent and that said Letters Patent is hereby corrected as shown below:

Column 10,
Line 25, "a minor coupled to a base, the minor and base" should read -- a mirror coupled to a base, the mirror and base --
Line 26, "position end a" should read -- position and a --
Line 62, "first end second" should read -- first and second --
Line 63, "are in the their respective" should read -- are in their respective --

Column 11,
Line 11, "snowing movement" should read -- allowing movement --
Line 21, "first aging surface," should read -- first engaging surface, --
Line 30, "when the moms for" should read -- when the means for --

Column 12,
Line 24, "when the mean, for" should read -- when the means for --
Line 44, "member includes" should read -- member includes a --

Signed and Sealed this

Nineteenth Day of April, 2005

JON W. DUDAS
*Director of the United States Patent and Trademark Office*